United States Patent
Smith et al.

(10) Patent No.: US 10,913,095 B2
(45) Date of Patent: *Feb. 9, 2021

(54) OZONE RAIN PAN

(71) Applicant: GUARDIAN MANUFACTURING, INC., Cocoa, FL (US)

(72) Inventors: Charles Smith, Merritt Island, FL (US); Thoram Charanda, Mount Dora, FL (US)

(73) Assignee: GUARDIAN MANUFACTURING, INC., Cocoa, FL (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/157,236

(22) Filed: Oct. 11, 2018

(65) Prior Publication Data

US 2019/0060964 A1 Feb. 28, 2019

Related U.S. Application Data

(63) Continuation-in-part of application No. 15/641,048, filed on Jul. 3, 2017, now Pat. No. 10,123,559.

(Continued)

(51) Int. Cl.
| | |
|---|---|
| B08B 3/04 | (2006.01) |
| A23N 12/02 | (2006.01) |
| A22C 17/08 | (2006.01) |
| A22C 21/00 | (2006.01) |
| A23B 7/153 | (2006.01) |
| A23L 3/00 | (2006.01) |
| A23L 3/3454 | (2006.01) |
| A23B 7/06 | (2006.01) |

(Continued)

(52) U.S. Cl.
CPC .............. *B08B 3/041* (2013.01); *A22C 17/08* (2013.01); *A22C 21/0061* (2013.01); *A23B 4/24* (2013.01); *A23B 7/06* (2013.01); *A23B 7/153* (2013.01); *A23L 3/001* (2013.01); *A23L 3/3454* (2013.01); *A23L 3/358* (2013.01); *A23L 3/3589* (2013.01); *A23N 12/02* (2013.01); *A23V 2002/00* (2013.01); *B08B 2203/005* (2013.01)

(58) Field of Classification Search
CPC . B08B 3/041; B08B 2203/005; A23L 3/3589; A23L 3/001; A23B 7/06
See application file for complete search history.

(56) References Cited

U.S. PATENT DOCUMENTS

| | | |
|---|---|---|
| 5,227,184 A | 7/1993 | Hurst |
| 5,494,576 A | 2/1996 | Hoppe et al. |

(Continued)

FOREIGN PATENT DOCUMENTS

| | | | |
|---|---|---|---|
| DE | 10210821 A1 * | 9/2003 | ............... A21C 9/04 |
| JP | 11206860 A * | 8/1999 | |

OTHER PUBLICATIONS

Machine translation: DE10210821, Riehle, M. (Year: 2003).*
Machine translation: JP 11-206860; Suzuki, A. (Year: 1999).*

*Primary Examiner* — Mikhail Kornakov
*Assistant Examiner* — Natasha N Campbell
(74) *Attorney, Agent, or Firm* — Kilpatrick Townsend & Stockton LLP

(57) ABSTRACT

Embodiments of the present disclosure relate generally to systems and methods for combining ozone and water to deliver ozonated water in a rinse stream. The ozone rain pan finds particular use for rinsing food products traveling along a conveyor line with ozonated water.

36 Claims, 11 Drawing Sheets

Related U.S. Application Data

(60) Provisional application No. 62/359,488, filed on Jul. 7, 2016.

(51) Int. Cl.
  *A23B 4/24* (2006.01)
  *A23L 3/358* (2006.01)
  *A23L 3/3589* (2006.01)

(56) References Cited

U.S. PATENT DOCUMENTS

| | | | |
|---|---|---|---|
| 5,514,399 A * | 5/1996 | Cordera | A21C 15/002 118/19 |
| 5,582,717 A | 12/1996 | Di | |
| 6,120,822 A | 9/2000 | Denvir et al. | |
| 6,132,629 A | 10/2000 | Boley | |
| 6,412,652 B1 * | 7/2002 | Woram | B65D 21/086 220/521 |
| 6,551,182 B2 | 4/2003 | Caracciolo, Jr. | |
| 6,644,043 B2 | 11/2003 | Later et al. | |
| 7,470,172 B2 | 12/2008 | Carracciolo, Jr. | |
| 8,696,796 B2 | 4/2014 | Gillette | |
| 9,226,523 B2 | 1/2016 | Leech et al. | |
| 9,924,727 B2 | 3/2018 | Massey et al. | |
| 2002/0192110 A1 | 12/2002 | Garlick | |
| 2003/0156978 A1 | 8/2003 | Gillette et al. | |
| 2005/0017380 A1 | 1/2005 | Namespetra et al. | |
| 2007/0157955 A1 | 7/2007 | Lin et al. | |
| 2008/0092601 A1 * | 4/2008 | Konides | D06F 35/001 68/13 R |
| 2008/0227680 A1 | 9/2008 | Lynn et al. | |
| 2008/0292498 A1 | 11/2008 | Resch et al. | |
| 2009/0071331 A1 | 3/2009 | Gillette et al. | |
| 2010/0151094 A1 * | 6/2010 | Choudhury | A47J 17/14 426/287 |
| 2012/0193303 A1 | 8/2012 | Hengsperger et al. | |
| 2015/0024096 A1 | 1/2015 | Leech et al. | |
| 2015/0157050 A1 | 6/2015 | Nicholson et al. | |
| 2018/0007948 A1 | 1/2018 | Smith et al. | |

* cited by examiner

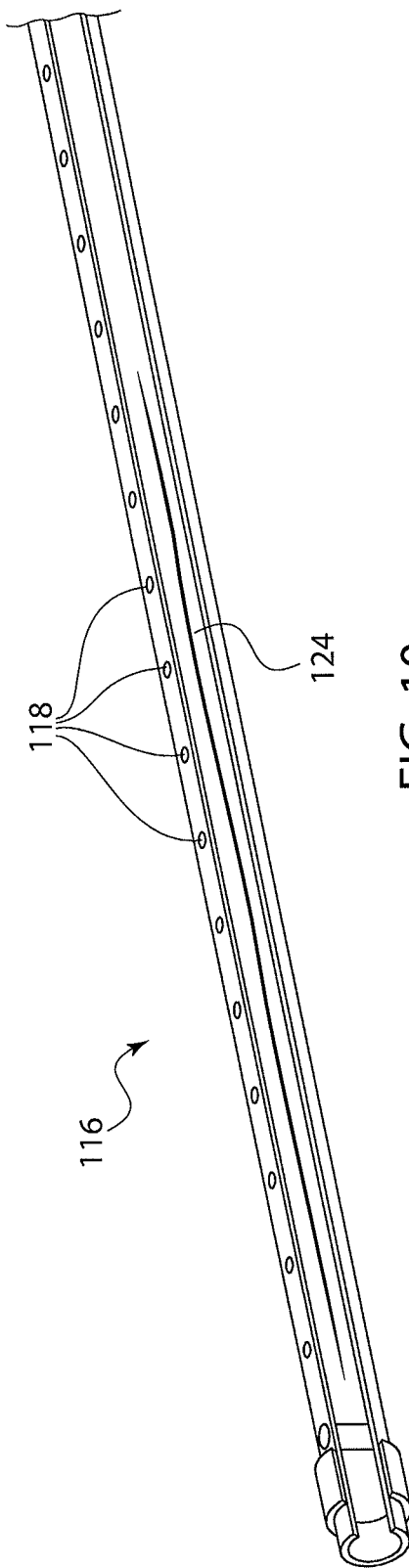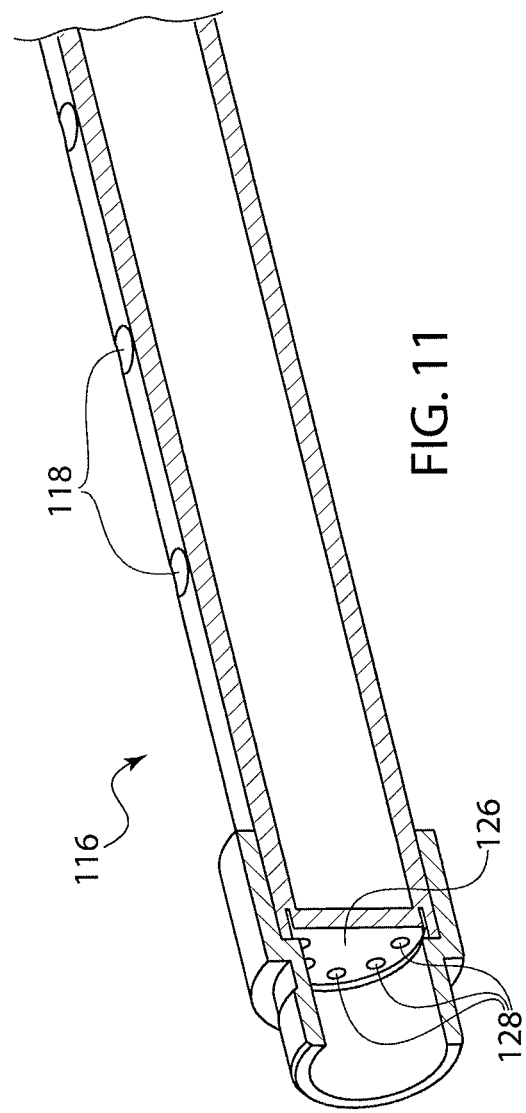

OZONE RAIN PAN

CROSS REFERENCE TO RELATED APPLICATIONS

This application in a continuation-in-part of U.S. Ser. No. 15/641,048 filed Jul. 3, 2017, issued as U.S. Pat. No. 10,123,559, which application claims the benefit of U.S. Provisional Application Ser. No. 62/359,488, filed Jul. 7, 2016, titled "Ozone Rain Pan," the entire contents of which are hereby incorporated by reference.

FIELD OF THE DISCLOSURE

Embodiments of the present disclosure relate generally to systems and methods for combining ozone and water to deliver ozonated water in a rinse stream. The ozone rain pan finds particular use for rinsing food products traveling along a conveyor line with ozonated water.

BACKGROUND

Ozonated water can be useful for disinfecting produce. Ozone can kill some of the microorganisms that would otherwise destroy the produce during storage. Current systems that use ozonated water for washing produce use spray head assemblies, also referred to as spray jets. In use, there is generally provided a pressurized pipe that delivers ozonated water into the processing area. Spray heads may be periodically positioned along the pipe(a) and/or a T-bar may be used for water delivery. Due to the gaseous nature of ozone, tests have found that spray jets can cause a loss of up to 70% or more of the dissolved ozone from the dosing source stream. For example, if the desired ozone level delivered to the product is 2 ppm, ozone generally needs to be dosed and run at levels up to 10 ppm in order to accommodate the atmospheric spray loss experienced due to the high to low pressure transition from the main supply line to the spray nozzle. Additionally, the amount of time the product is actually being dosed with the ozonated spray water is very short, typically for only a matter of 1-2 seconds. Further, because of potential ozone off-gassing in the vicinity of personnel, it is desirable to limit the amount of ozone lost from the ozonated water spray for safety reasons. Accordingly, improved methods for delivering ozonated water are desirable.

BRIEF SUMMARY

Embodiments of this disclosure thus provide systems and methods for delivering an ozone product, such as ozonated water, to a desired location. One example provides an ozone rain pan, comprising a water containment portion with at least one ozonated water inlet, a plurality of openings on a lower surface of the water containment portion; and an ozone destruct outlet. There may be provided an exhaust fan for removing off gassed air from ozonated water held in the water containment portion. The ozone rain pan may have one or more air openings for allowing fresh air to enter the water containment portion and/or a lid positioned over the water containment portion. The ozone destruct outlet may be positioned on the lid.

A further embodiment provides a modular rain pan system that includes separate lower surface panels. A further embodiment provides a water diverter configured to deliver and even inflow of water to the water containment portion of the pan.

Another feature that may be provided is an overflow management system. The overflow management system may be an overflow wall and an overflow exit opening. The rain pan may include a system for mounting the water containment portion with respect to a conveyor. This mounting system may be one or more adjustable legs. Alternatively, this mounting system may be a shower head-like mount.

In use, the plurality of openings allow a rain stream of ozonated water to fall via gravity force through a lower surface and onto on one or more food products. This rain stream is not sprayed or pressurized, it is a gravity-fed rainfall. It is possible to mount the ozone rain pan in a processing area for treatment of produce. It is possible to mount the ozone rain pan in a processing area for treatment of poultry or meat products. Other options as possible and considered within the scope of this disclosure.

A further embodiment disclosed provides a method for delivering a rain stream of ozonated water, comprising (a) mounting the disclosed ozone rain pan over a treatment zone; and (b) delivering ozonated water into at least one of the inlets of the ozone rain pan.

BRIEF DESCRIPTION OF THE DRAWINGS

FIG. 10 shows a side cross-sectional view of one embodiment of a water diverter.

FIG. 11 shows a side cross-sectional view of an alternate embodiment of a water diverter.

DETAILED DESCRIPTION

As part of the microbiological control strategy of a food product processing plant (including quality assurance and quality control), ozone is a key technology for the intervention and destruction of microorganisms such as bacteria, viruses, yeast, mold or other species to be controlled. The ozone rain pan described herein is designed to dose food products with a complete coverage of ozonated water for disinfection. The ozone rain pan may be used in conjunction with produce (such as apples, pears, cantaloupes, cherries, grapes, and any other produce types). In other examples, the ozone rain pan may be used in conjunction with other food products, such as poultry, meats, or any other options. Any products that may benefit from ozonated water treatment may be treated using the systems and methods described herein. In the described examples, ozonated water is allowed to "rain" on the product, allowing a longer contact time and eliminating much of the atmospheric off gas related to the use of spray jets.

One goal of the ozone rain pan is to address the need for achieving the required concentration times time (CT in units of mg-min/L) values for greater than 3-log kill of the common problematic microorganisms found in food processing plants (*Listeria m., E. coli, salmonella* and *campylobacter*). The ozone rain pan achieves this by directly dosing the product moving on a conveyor system through a constant shower of highly ozonated water. The distance over which the food product is dosed may span two or more linear feet. The dosing distance may be dependent upon the dimensions of the ozone rain pan body. In one specific example, the distance may be less than two feet, such as ½ foot to one foot or even less, depending upon design and treatment needs. In other examples, the distance may be greater than two feet, such as up to 3-6 feet or even longer. In many instances, the conveyor may have a brush head which causes a revolution of the produce or other food products being treated. The length of the ozone rain pan treatment zone may be modified such that the product being treated is generally treated on all sides, along a full rotation/revolution. (If the system is used to treat cantaloupe, it is generally expected that the treatment zone may be designed to be longer than the treatment zone length needed if the system is used to treat cherries, for example.)

Figure 1:
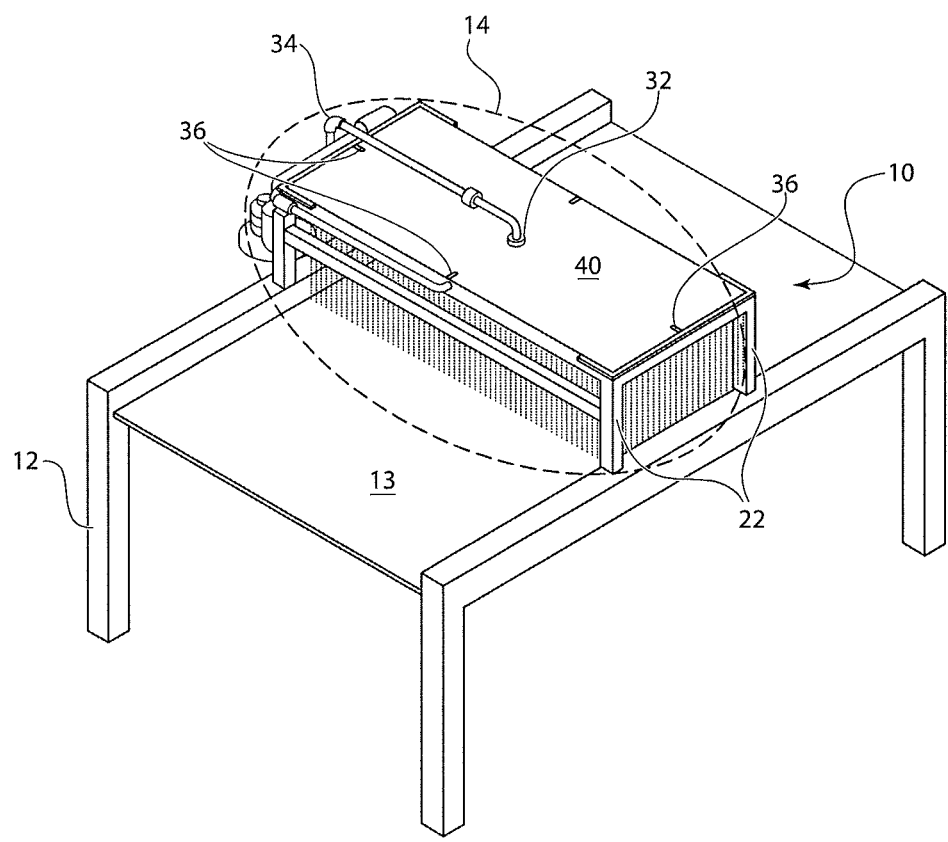
FIG. 1 shows a side perspective view of an ozone rain pan mounted on a conveyor system.
Figure 2:
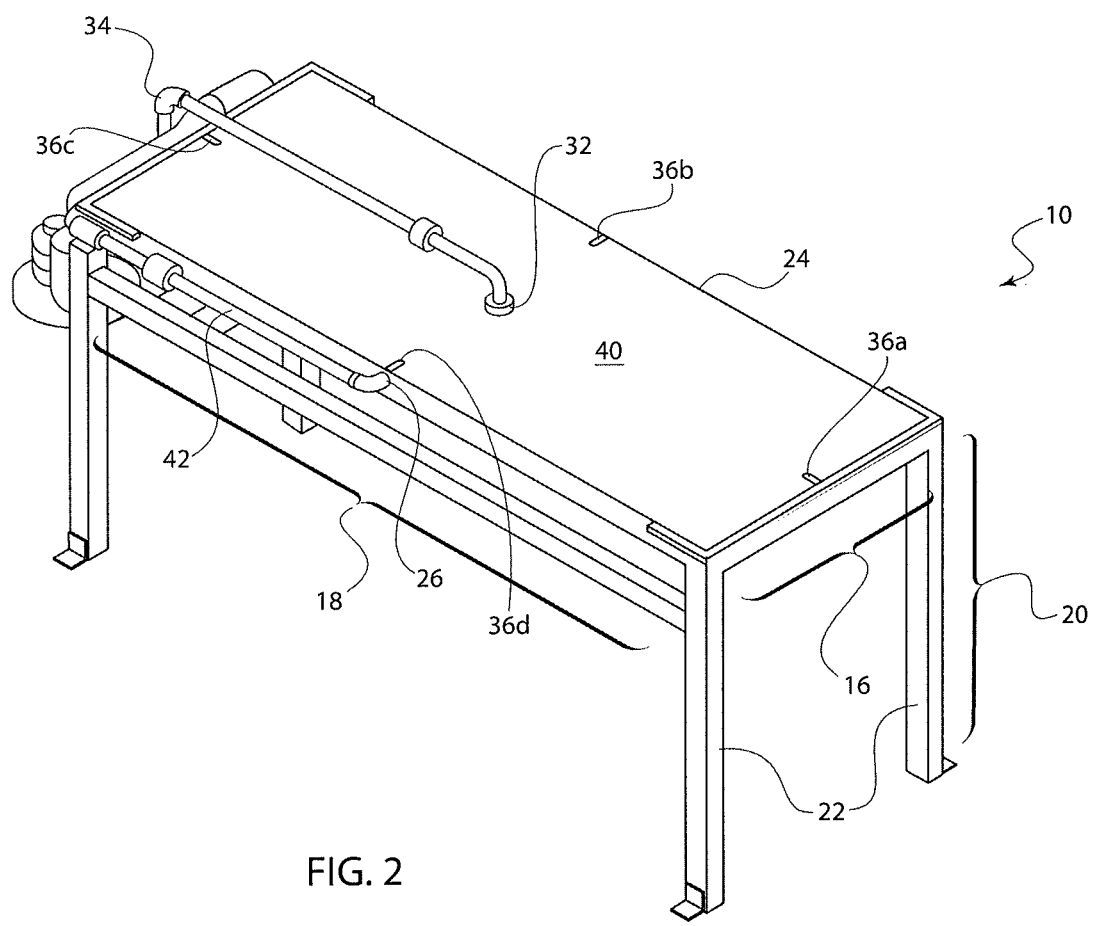
FIG. 2 shows a side perspective view of an ozone rain pan.

As illustrated by FIG. 1, the ozone rain pan 10 may be positioned atop a conveyor system 12. For example, the rain pan 10 may be directly mounted to the conveyor system 12. This configuration is provided as an example only. It should be understood, however, that the ozone rain pan 10 may be positioned in any location that allows an ozonated water stream to be directed as desired. For example, the rain pan 10 may be mounted above the conveyor, like a rain shower head. The rain pan 10 may be mounted to the ceiling of the treatment space or on a separate mounting scaffold. As food products are moved along the belt 13 of the conveyor system 12, they reach an ozone treatment zone 14. The length of the ozone treatment zone 14 may be dictated by the length 16 of the ozone rain pan 10. As illustrated by FIGS. 1 and 2, the distance across the ozone treatment zone 14 is generally dictated by the width 18 of the ozone rain pan 10. This width 18 is generally designed to correspond to the width of the conveyor belt 13. Conveyors are generally about three to six feet wide, so it is generally envisioned that the ozone rain pan 10 will correspond thereto. The height 20 of the ozone treatment zone 14 is dictated by the height of legs 22 of the ozone rain pan 10. The legs 22 may be designed such that the height 20 of the ozone treatment zone 14 corresponds to the food product being treated. It is desirable that the "rain" of ozonated water from the rain pan 10 be close enough to the food product that treatment be effective. In a specific example, the rain pan may be mounted so that the distance between the rain pan and the food product is about 6 inches to about 2 feet. In a specific example, the ozone rain pan in mounted about 7.75 inches (+/− about 1.5 inches) above the conveyor mounting surface. That can put the pan at about 6.25 inches to about 9.25 inches above the conveyor. It should be understood that alternate mounting heights are possible and considered within the scope of this disclosure. The legs 22 are generally provided as a means to mount the water containment portion with respect to the conveyor.

In one specific example, the legs 22 may be about 10 to 16 inches high. In another specific example, the legs 22 may be made to be adjustable, such that the height of the ozone treatment zone may be adjusted based on the food product being treated. The adjustability may be provided by any appropriate system, such as ball and detent adjustability, telescoping legs, or any other appropriate option. The adjustability may be provided by leveling feet. In another example, there may be provided a single leg, which functions as a bracket to secure the ozone rain pan 10 directly to one side of the conveyor system 12. It is also possible for the ozone rain pan 10 to be mounted to a wall or other structure. The bracket of the rain pan 10 may be designed to swivel so that the rain pan can be moved to address multiple nearby conveyor systems 12.

Although not shown, another means for mounting the water containment portion of the rain pan with respect to the conveyor may be a showerhead-like mount. The mount may allow the rain pan to be moved up and down with respect to the conveyor. The mount may allow the rain pan to be mounted above the conveyor. The mount may be telescopable, expandable with scissor-like arms, may be positioned on a mechanical arm, or another other option. The mount may allow the rain pan to be raised and lowered and optionally locked in place. The general intent is to position the ozone rain pan in close proximity to the item(s)/product(s) to be treated.

Figure 3:
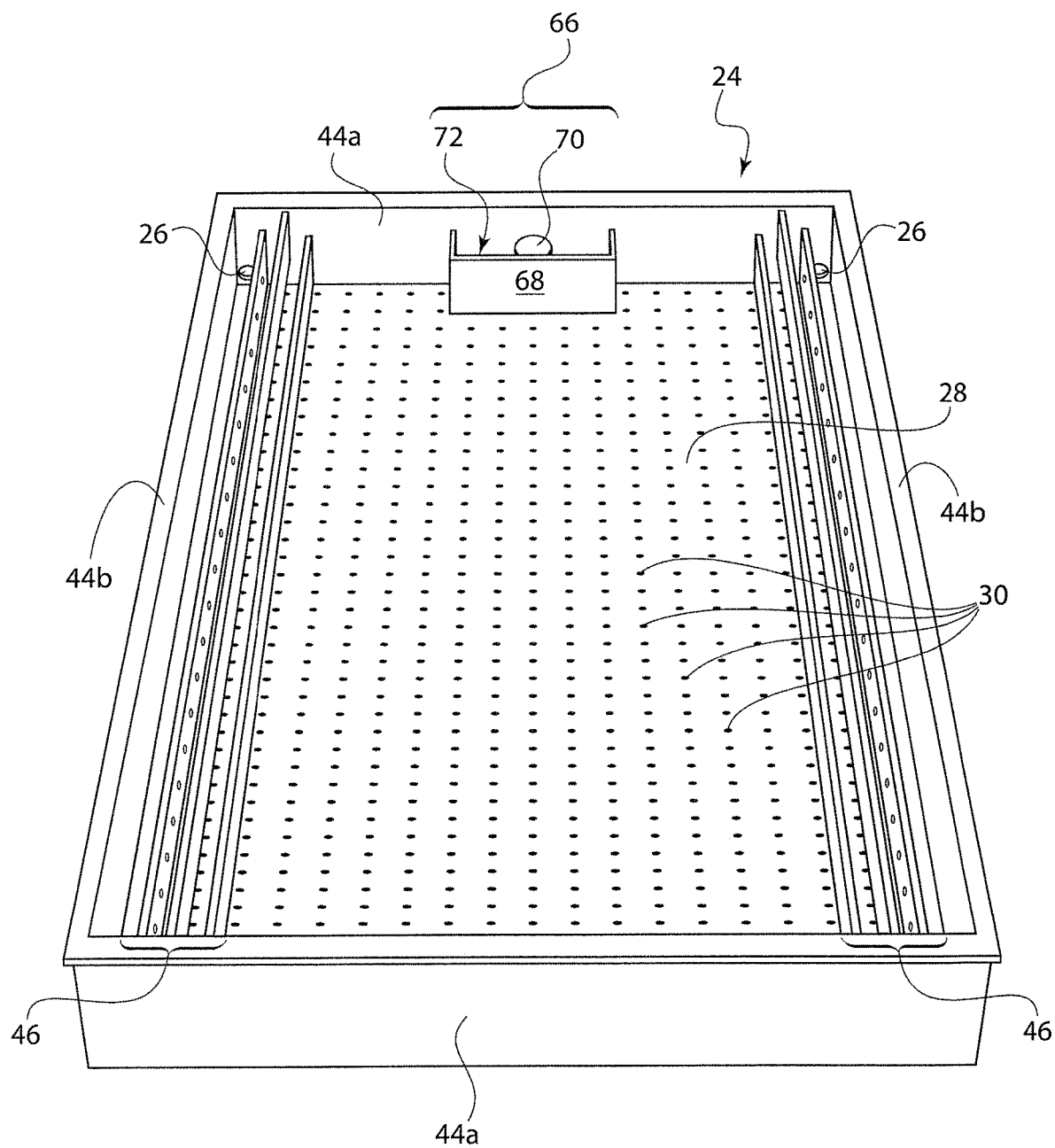
FIG. 3 shows a top perspective view of an alternate ozone rain pan with the lid removed.

The ozone rain pan 10 is generally provided as having a water containment portion 24. The water containment portion 24 has a lid 40 that encloses the entire flooded area of ozonated water as it enters from the ozone skid. FIG. 3 illustrates a water containment portion 24 with the lid 40 removed. In use, ozonated water is delivered directly into the water containment portion 24 via an inlet 26. The inlet 26 is generally shaped to receive the end of a water delivery conduit 42, such as a one or two inch diameter water hose or pipe. These dimensions, of course, may be altered as appropriate. In use, ozonated water flows into the water containment portion 24 of the pan via one or more inlets 26. (Ozone is injected into the water at an ozone generator area separate from the ozone rain pan described.)

More specifically, the water containment portion 24 is defined by a series of sides 44. The sides 44 may have any appropriate dimensions, depending upon the size of the water containment portion 24 for the intended use. In one specific example, the end sides 44a may be about 3 to 8 inches high and about 2 to 4 feet long. Elongated sides 44b may also be about 3 to 8 inches high and about 1 to 8 feet long. In a specific example, sides 44a and elongated sides 44b are about 4-5 inches high. The sides 44a may be about 3 feet long, and the elongated sides 44a may be about 3-8 feet long. An inlet 26 is positioned on at least one of the sides 44. It is possible to have more than one inlet 26 provided in order to define more than one ozonated water entry point. In FIG. 3, two inlets 26 positioned along the side 44a to define a left inlet and a right inlet. More or fewer inlets 26 are possible.

Figure 4:
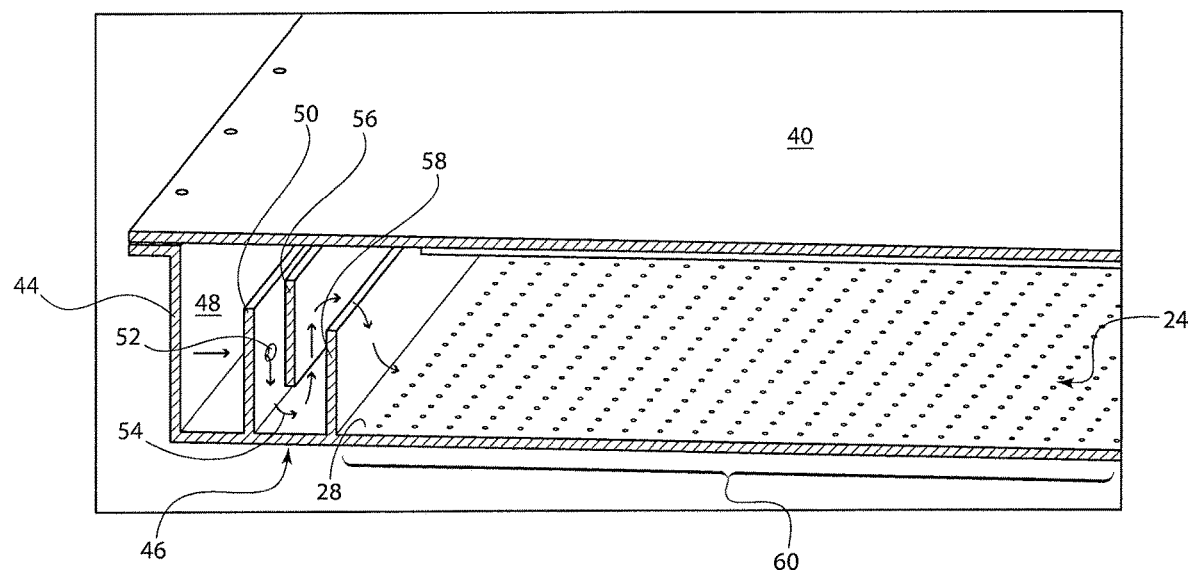
FIG. 4 shows a side cutaway view of an ozone rain pan, illustrating a baffle system.

The lower surface 28 of the ozone rain pan 10 has a plurality of openings 30 which are designed to allow the water contained in the central holding portion 60 of the containment portion 24 to "rain" out. The openings are sized and configured to allow water to flow through the openings via gravity. They are not spray openings or pressurized openings. The size of the openings 30 may be modified as necessary. They are generally sized such that water may collect in the containment portion 24 at about ½ to about ¾ inch of water level. The openings 30 may be positioned in a generally regular pattern. For example, FIG. 4 illustrates openings 30 as having a grid-like pattern. In other examples, the openings 30 may be positioned in irregular or other shaped patterns. The openings may be circular openings, similar to a rain-like showerhead. The openings may be elongated slits. The openings may be any other appropriate shape. In a specific example, the size of openings may be about 0.05 inches. In some embodiments, it is possible for the water containment portion 24 of the ozone rain pan 10 to be welded from a single sheet of material. For example, the lower surface 28 and the sides 44 may be formed integrally. It has been found, however, that manufacturing may be simplified and manufacturing costs lowered by providing the ozone rain pan components as separate components that are bolted or otherwise secured to one another. Additionally, this structural design change can ease modularity and incorporate the ability to provide varying custom sizes in a more economical and expedited manner. For example, a modular ozone rain pan 90 allows a manufacturer to provide a number of different sizes in its offerings, which can be customized based on customer requirements.

Figure 8:
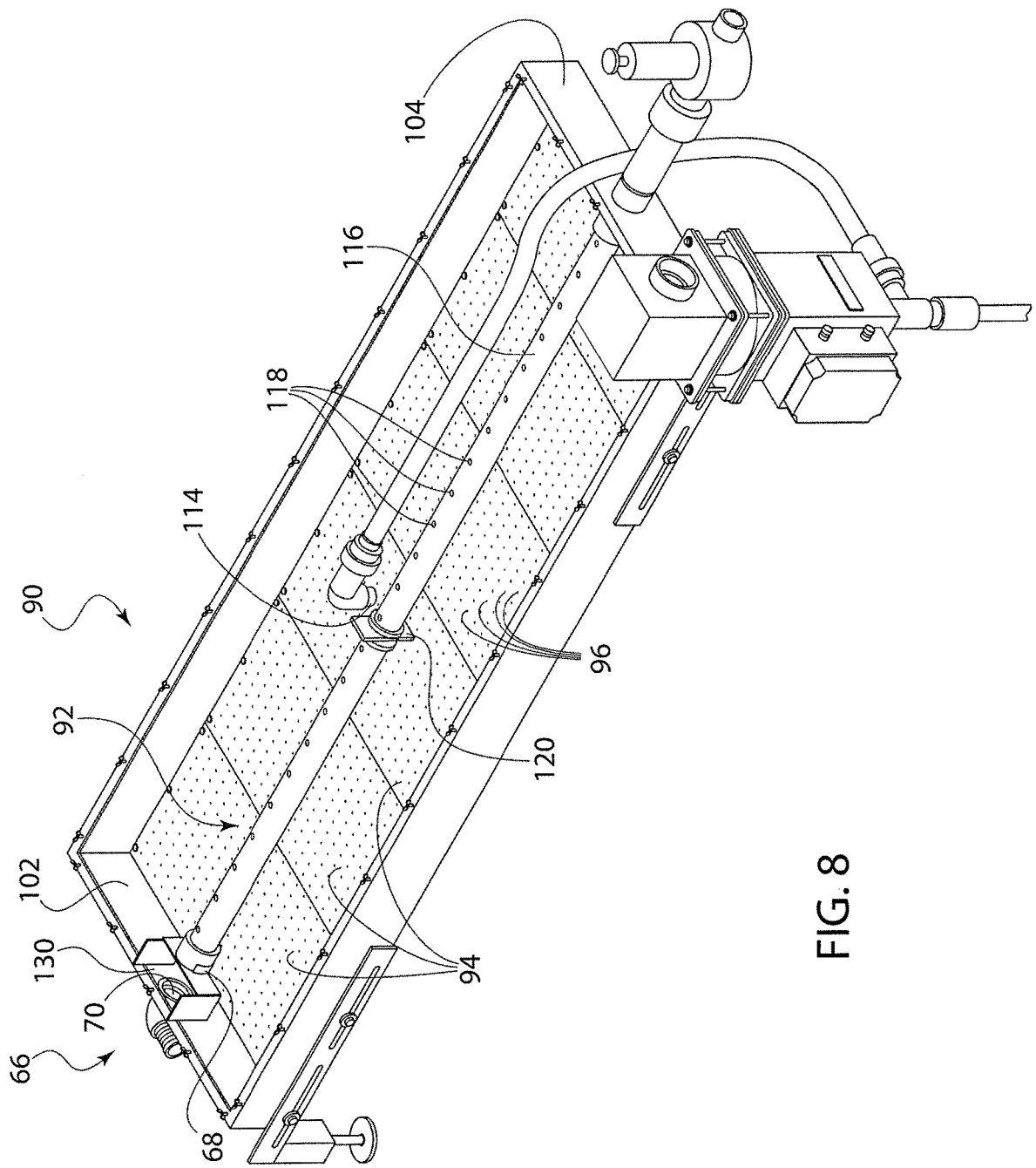
FIG. 8 shows a side perspective view of a modular ozone rain pan with a plurality of lower surface panels and a central water diverter pipe.

FIG. 8 illustrates a modular ozone rain pan 90. In this example, the lower surface 92 of the rain pan 90 is formed of a plurality of panels 94. Each of the panels 94 is provided with plurality of openings 96, which may be similar in shape and dimension to the above-described openings 30. It is generally envisioned that opening 96 size and spacing will be similar between each of the panels 94 used, but that is not a requirement of the disclosed design. FIG. 8 shows a rain pan having a total of six panels 96 forming over surface 92, however it should be understood that any number of panels 94 may be used and is considered within the scope of this disclosure. The number of panels 94 used depends upon the desired dimensions of the rain pan 90. If openings 96 of a particular panel 94 become clogged or if the panel 94 otherwise becomes damaged, removal and replacement of a single panel 94 can be eased with the modular design disclosed.

In one example, the panels 94 may be manufactured of a polyvinyl chloride (PVC) or other plastic-like material. It has been found that PVC is easier to clean than other metal materials explored. Additionally, PVC is lighter and can be less expensive for manufacturing. However, it should be understood that metallic materials (such as aluminum, steel, or any other option) are also possible and considered within the scope of this disclosure.

In a specific example, each panel 94 can be about ⅛ to about ½ inch thick. In a specific example, the panels 94 are about ¼ inch thick. Other options are possible and considered within the scope of this disclosure. Additionally, each panel 94 can be about 12 inches long and about 24 inches wide. It should be understood that these dimensions are provided for exemplary purposes only, that they may be interchanged with one another, and that alternate dimensions are possible and considered within the scope of this disclosure depending upon conveyor sizes and customer requirements.

Figure 9:
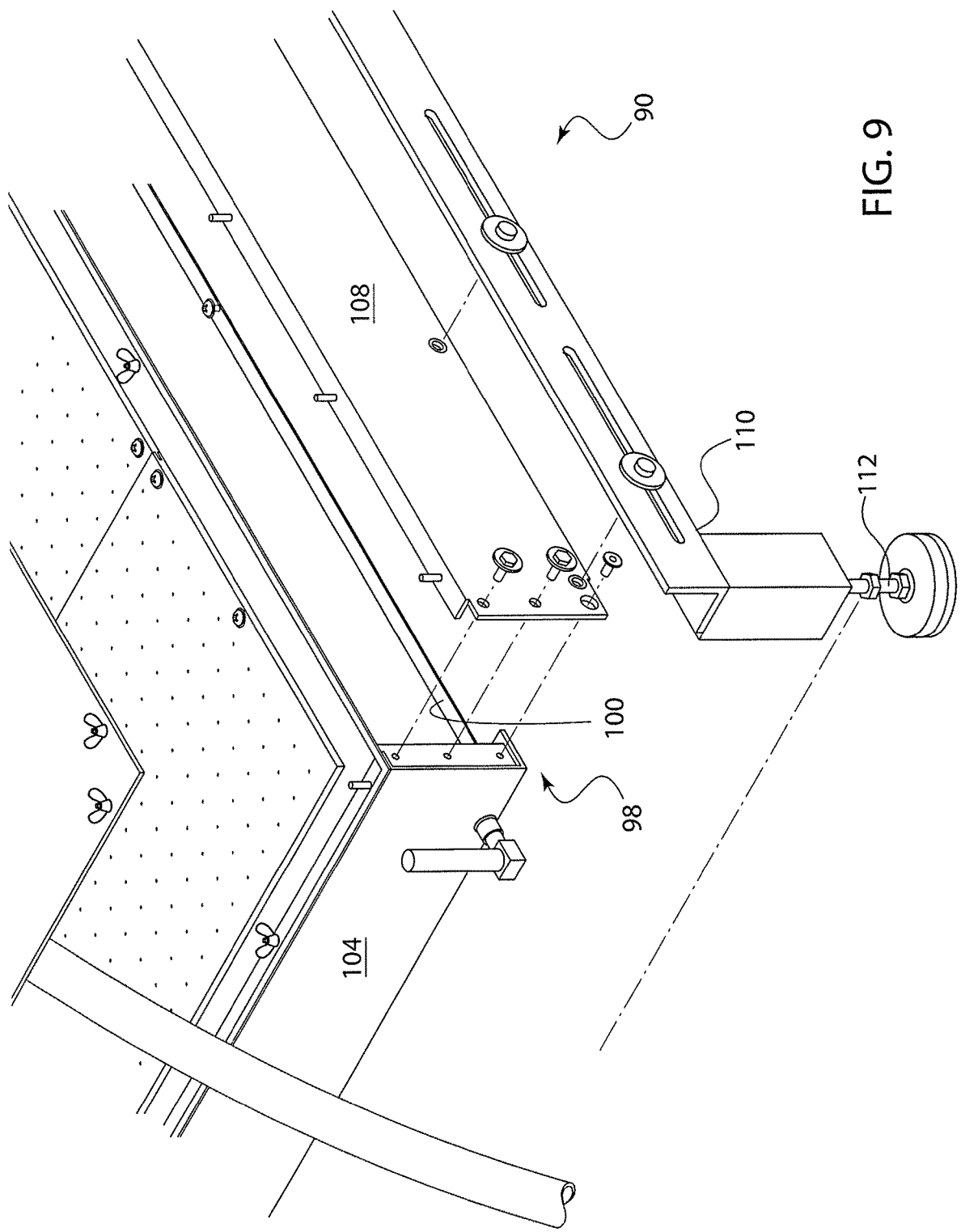
FIG. 9 shows an exploded side perspective view of the modular ozone rain pan of FIG. 8.

In order to manufacture the lower surface 92 of the modular ozone rain pan 90, a rain pan frame 98 may be provided. In the example illustrated by FIG. 9, the rain pan frame 98 includes side rails 100 that generally span the width of the rain pan 90. Side rails 100 may be provided as a series of one or more rails that are secured to one another. Alternatively, side rails 100 may be provided as a single integral elongated rail. Side rails 100 are generally secured to and extend from end walls 102, 104. Any type of fixation feature may be used, such as bolts, screws, wing nuts, or any other appropriate securement system. In order to ensure a watertight seal between side rail 100 and panels 94, a layer of sealant may be applied along an upper surface of the side rail during manufacturing and around bolt holes or other attachment openings formed in the components. Sealant may also be applied around all bolt openings shown. One exemplary sealant is silicone, but other options are possible and considered within the scope of this disclosure. In use, panels 94 are secured to side rails 100 in a generally end-to-end manner, such that panel ends abut one another. Additional sealant may also be applied between and along panels 94.

Sidewalls 108 complete the modular ozone rain plan 90. The sidewalls 108 may be shaped to cooperate with end walls 102, 104. Separate support legs 110 may also be assembled to the sidewalls 108. As shown, the legs 110 may be formed as having an L-shaped cross section that allows them to fit closely with the angle formed by cooperation between the sidewall 108 and the panel 94/side rail 100. Legs 110 may be bolted, screwed, or secured to the frame in any other appropriate fashion. Legs 110 may be stationary or may be telescoping in nature to alter the height of the pan. Legs 110 may also be provided with adjustable feet 112 which may be used to level the rain pan 90 as needed. These components may be metal, such as aluminum. In other examples, these components may be PVC or any other appropriate plastic-like material.

Referring back to FIG. 8, which shows the modular ozone rain pan 90 without a lid in place, ozonated water may be delivered into the pan 90 via a central inlet 114. Additionally or alternatively, ozonated water may be delivered into the pan 90 via side inlets. In either option, in this embodiment, ozonated water is delivered into a water diverter 116. As shown, water diverter 116 may be an elongated water pipe that has a plurality of openings 118 therein. In a specific example, the openings 118 may be positioned along an upper portion of the water diverter 116 in order to encourage water to fully fill the diverter water pipe prior to water spilling out and exiting the water diverter 116 into the body of the rain pan 90. It is generally envisioned that the openings 118 will be somewhat evenly spaced along the water diverter 116 in order to encourage an even distribution of water. The size, shape, and other dimensions of openings 118 may be modified to meet various water flow and size requirements. An optional support 120 may be provided about midway along the water diverter 116 in order to help support the water pipe and prevents it from sagging in use. Additionally, either end of the water diverter 116 may be supported by end walls 102, 104.

In some embodiments, it has been found useful to provide a central rod 124 that runs within the water diverter 116. Presence of central rod 124 can help manage turbulence and water pressure buildup, and can help break up water flow. One example is illustrated by FIG. 10. Additionally or alternatively, one or more plates 126 having openings 128 formed therein may be positioned along the water diverter 116. One example is illustrated by FIG. 11. In a specific embodiment, a plate 126 is positioned at one end of the water diverter 116. It is possible, however for a plate 126 to be positioned each end of the water diverter 116 or otherwise along other portions of the water diverter 116. The presence of plate(s) 126 can help break up water flow, preventing too much water from exiting the water diverter 116 at any particular point. Water meets plate 126 and then is slowed due to the presence of openings 128. Openings 128 are shown as spaced circumferentially, but any opening position that helps manage water flow may be used.

Providing a water diverter 116 can be useful because it manages and otherwise slows the influx of water from the inlet 114 into the central holding portion of the rain pan 90.

If all water is delivered into the pan at once, a stronger flow or "rainfall" stream may be experienced along certain portions of the rain pan, nearest the water entry point, e.g., through openings that are closest to an inlet. By allowing incoming water to stream into the diverter 116 and then flow out through openings 118 once the diverter is filled, a more even stream of water can be delivered across the rain pan.

In some instances, it may be possible for the ozone rain pan 90 to become overflowed. In order to manage this possibility, an overflow management system 66 may be provided, illustrated by FIG. 8. The system includes an overflow enclosure 130 and an overflow exit opening 70. If the water in the rain pan 90 rises above the top of the overflow wall 68, the water will begin to flow into the interior space created between the overflow wall 68 and the end wall 102. Excess water may then exit through the overflow exit opening 70. Although only a single overflow enclosure 130 is shown, it should be understood that it is possible to provide an overflow enclosure at each end of the rain pan 90. Overflow exit 70 may cooperate with tubing or other water conduit. It is possible for the water to be rerouted back into water inlet 114. In another example, it is possible for the excess water to be routed elsewhere for other uses.

Figure 12:
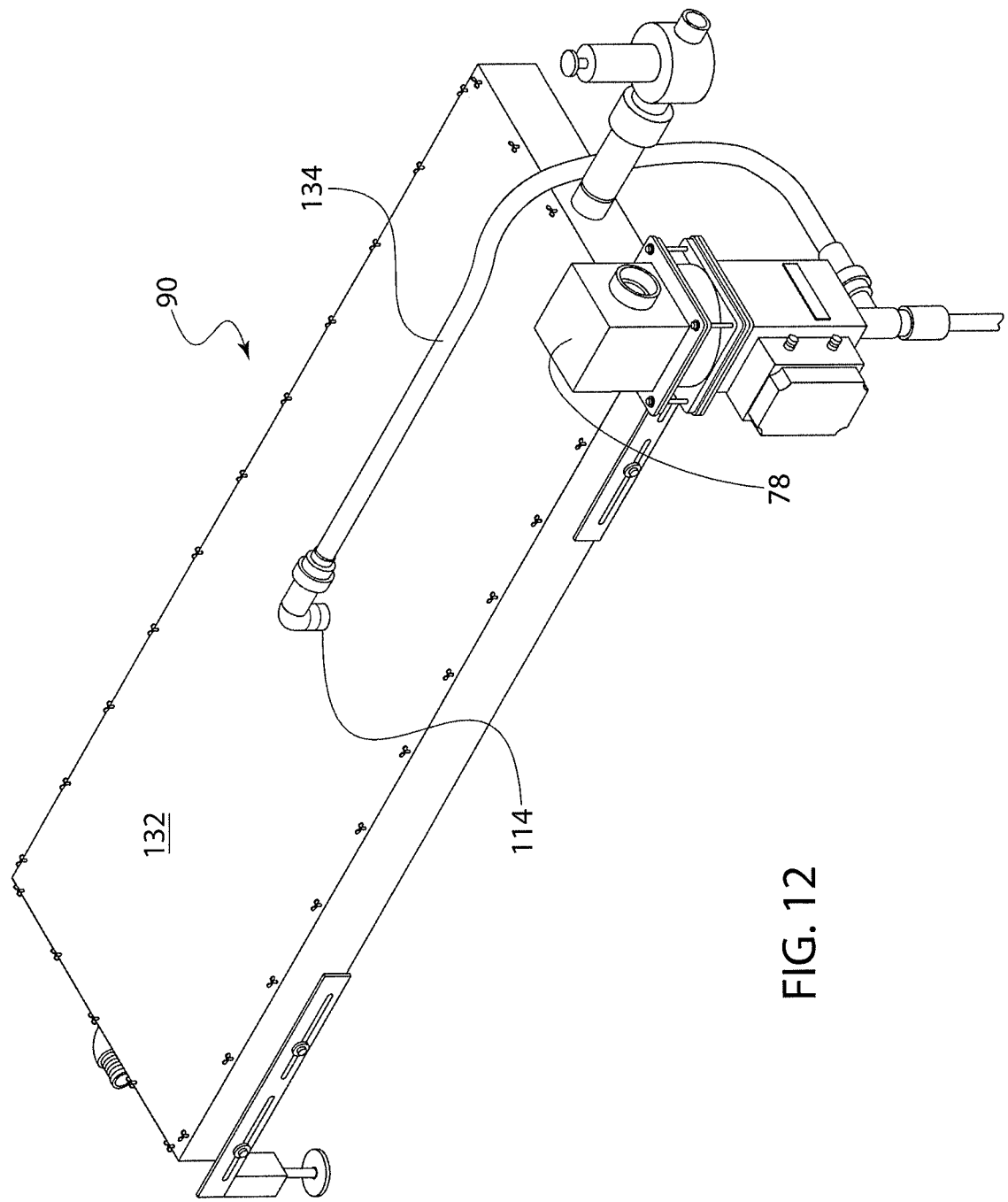
FIG. 12 shows a side perspective view of the ozone rain pan of FIGS. 8 and 9 assembled and with a lid in place.

FIG. 12 illustrates an assembled ozone rain pan 90, having a lid 132 in place. In this embodiment, the lid 132 supports the water inlet 114. The water inlet 114 generally cooperates with a water delivery line 134 as shown. FIG. 12 also illustrates ozone destruct unit 78.

In an alternate embodiment shown by FIGS. 3 and 4, water containment portion 24 may include a baffle system 46. FIG. 3 illustrates two sets of baffle systems 46, one along each elongated side 44b. One benefit of providing a baffle system 46 is to help maintain an even water flow within the water containment portion 24. A sectional side perspective view of baffles 46 is illustrated by FIG. 4. In use, delivery of water into inlet 26 initially allows water to pool in a first channel 48. The first channel 48 is bounded by a sidewall 44 and a first baffle 50. First baffle 50 is secured to the lower surface 28. Water collecting in the channel 48 is allowed to flow through optional openings 52 in the first baffle 50, once it reaches the height of openings 52. If water is delivered into first channel 48 more quickly than the openings 52 can filter, it is possible for water to flow over the top of first baffle 50. Once past the first baffle 50, water may then enter flow channel 54. Flow channel 54 moves underneath a second baffle 56 and over third baffle 58. (Although the second baffle 56 appears to be floating, it will be welded or otherwise secured to one of the sidewalls 44. The third baffle 58 is welded to the lower surface 28.) In a specific embodiment, the third baffle 58 has a shorter height than the first baffle 50. When water reaches the top of the third baffle 58, it is allowed to waterfall thereover, following the arrows of the flow channel 54. The purpose of baffle system 46 is to manage the influx of water into the central holding portion 60 of the water containment portion 24 of the ozone rain pan 10, as described further below.

The baffle system 46 and the openings 30 cooperate together in order to deliver a study in constant "rainfall" of water leaving the ozone rain pan for example. Providing a baffle system 46 can be useful because it manages and otherwise slows the influx of water from the inlet 26 into the central holding portion 60. If all water is delivered at once, a stronger flow or "rainfall" stream may be experienced along edges of the rain pan, or through openings that are closest to an inlet. By allowing incoming water to pool in the first channel 50 and then to flow through flow channel 54, a more even stream of water may be delivered across the rain pan. Additionally, the size of the openings 30 may be optimized for the size of the rain pan and the desired flow rate to be achieved. In some examples, the openings 30 may range from about 0.02 inches to about 0.08 inches in circumference. In a specific example, the openings 30 are about 0.05 inches in circumference. The openings 30 may be spaced apart from one another as desired for treatment. In one example, the spacing may range from about 0.5 inches to about 1.5 inches between a center of one opening to a center of an adjacent opening. In a specific example, the centers of the openings are spaced about 1 inch from one another.

In some instances, it may be possible for the water containment portion 24 to become overflowed. In order to manage this possibility, the central holding portion 60 is provided with an overflow management system 66, illustrated by FIG. 3. The system includes an overflow wall 68 and an overflow exit opening 70. If the water in the central holding portion 60 rises above the top of the overflow wall 68, the water will begin to flow into the interior space 72 created between the overflow wall 68 and the sidewall 44. Excess water may then exit through the overflow exit opening 70, which is formed as an opening in the sidewall 44. Overflow exit 70 may cooperate with tubing or other water delivery conduit. It is possible for the water to be rerouted back into one of the inlets 26. In another example, it is possible for the excess water to be routed elsewhere for other uses.

Figure 5:
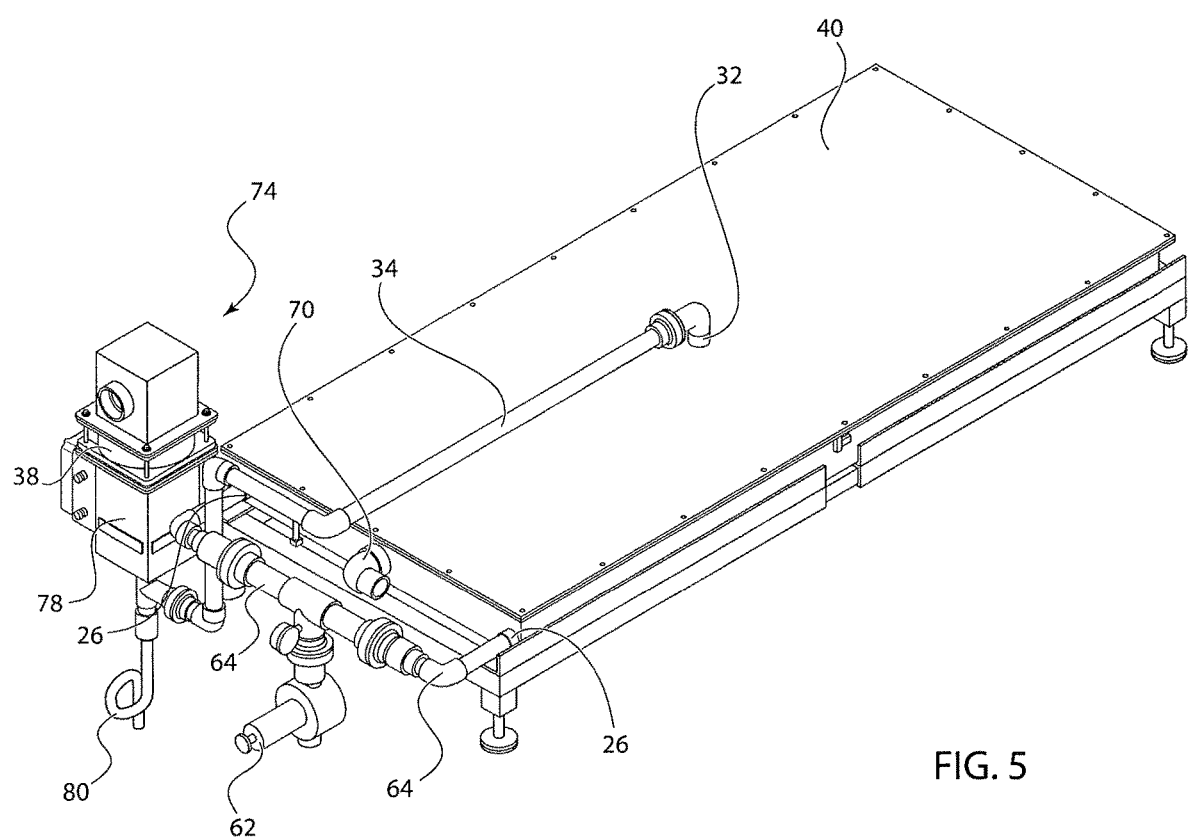
FIG. 5 shows a side perspective view of an ozone rain pan, illustrating the exhaust fan and ozone destruct system.

FIG. 5 illustrates a side view of the ozone rain pan 10. This figure illustrates that two inlets 26 may cooperate with a single ozonated water inlet 62, which splits into left and right conduits 64 to feed left and right inlets 26. In the alternate embodiment illustrated by FIG. 8, water inlet 114 may be located along a central upper portion of the pan. In this version, water inlet 114 is generally cooperative a with an opening in the lid 134 and engages water diverter 116. In either version, the water inlet 62, 114 may be provided with a pressure regulator. The pressure in the water delivery conduit 64 that cooperates with the inlets 62 and 26 or 114 for delivery of water into the ozone rain pan may be similar to the pressure used in an overhead pressurized ozonated water pipe for a storage room. For example, the pressure in the water conduit delivering the ozonated washer may be about 20 psi or less. Pressure may be varied in order to meet the ozonated water delivery requirements. Water pressure may be varied to speed or slow the delivery of water. The water is generally ozonated upstream of the water inlet 62, 114 via an ozone generator. Exemplary ozone generators for this purpose are manufactured and sold by Guardian Manufacturing, Inc., of Cocoa, Fla.

FIGS. 5, 8 and 12 also illustrate one example of an exhaust duct system 74 that may be used to channel ozonated air out of the water containment portion 24 to an ozone destruct system. In one example, an exhaust fan 38 may be used to pull ozonated air from the water containment portion 24. The lid 40 or 132 (or one or more of the end walls or sidewalls) may be provided with an ozone destruct outlet 32. Although illustrated as positioned at an upper/lid surface of the water containment portion 24, it is possible for the ozone destruct outlet 32 to be positioned anywhere along the water containment portion 24. One example is illustrated by FIGS. 8 and 12, in which the ozone destruct system 74 is positioned at a corner or side wall of the rain pan 90. In one example, the pressure in the water containment portion 24 is just slightly above atmospheric pressure. Suction from the exhaust fan 38 is very slight, just enough to remove the ambient air/ozonated air combination out through outlet 32.

In one specific example, the pressure may be about −0.1 psi. Air leaving outlet 32 travels through conduit vent pipe 34 to the destruct unit 78. The destruct unit 78 also has a condensate drain 80.

FIGS. 1 and 2 illustrate a rain pan embodiment with a series of air holes 36 in the ozone rain pan 10. FIG. 2 shows an example having four air holes 36*a-d*, one positioned along each edge of the pan. This is provided as example only; it should be understood that air holes 36 may be positioned anywhere appropriate. In use, the air holes 36 allow a small amount of fresh air to be pulled into the water containment portion 24. In other embodiments, specified air holes may not be present, but fresh air is allowed to enter the top of the rain pan via the overflow exit opening/port 70 on the side of the pan. This fresh air is allowed to mingle with any off-gassed ozonated air that may rise from the water in the pan, all of which is collectively pulled out through the ozone destruct outlet 32. The exhaust fan 38 will pull the air and the small amount of ozone off gas from within the rain pan containment portion and send it through a catalytic destruct unit that will convert the ozone back into pure oxygen. This will ensure a safer work environment for the plant's employees, because the potential level of gaseous ozone is nearly eliminated.

Figure 6:
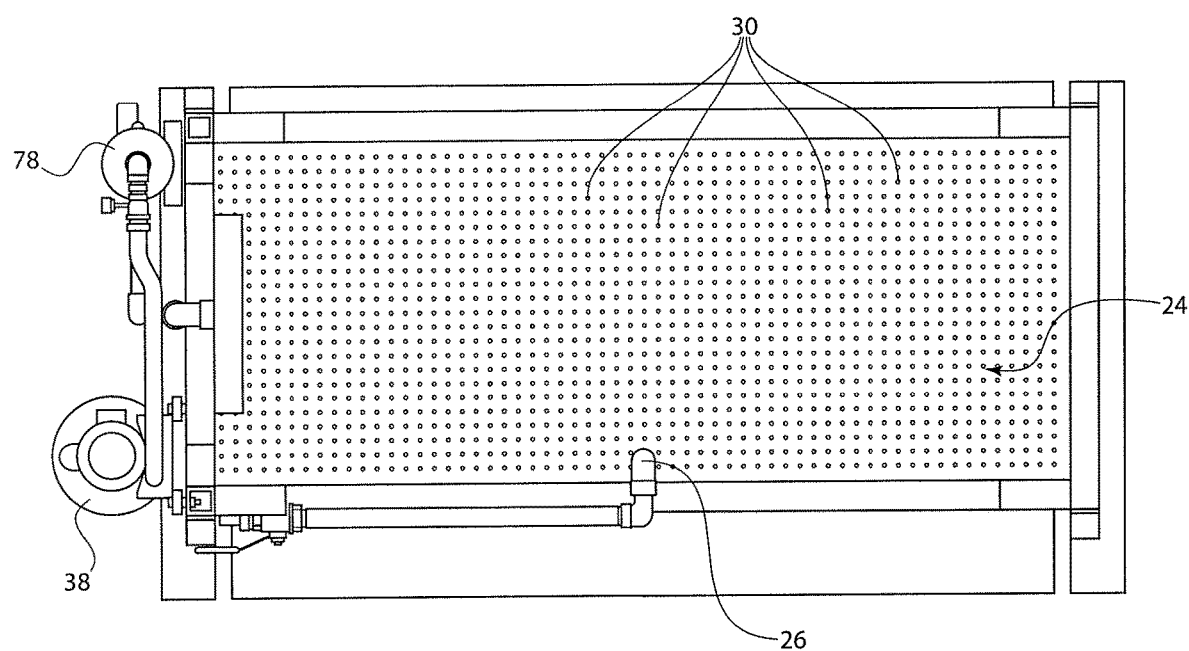
FIG. 6 shows a top plan view of the ozone rain pan of FIG. 2.
Figure 7A:
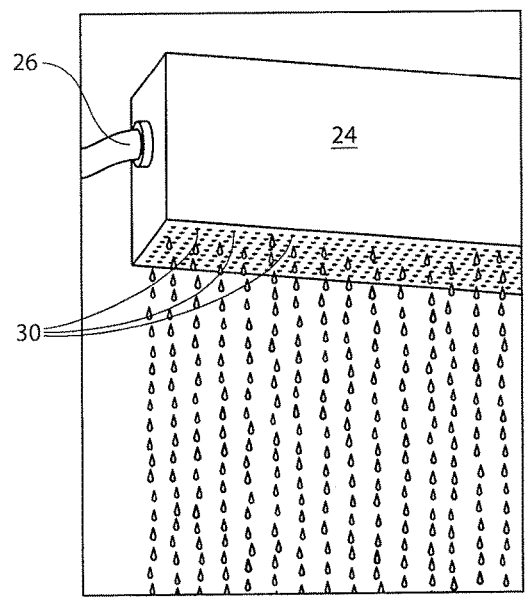
FIGS. 7A and 7B illustrate side views of an ozone rain pan in use.
Figure 7B:
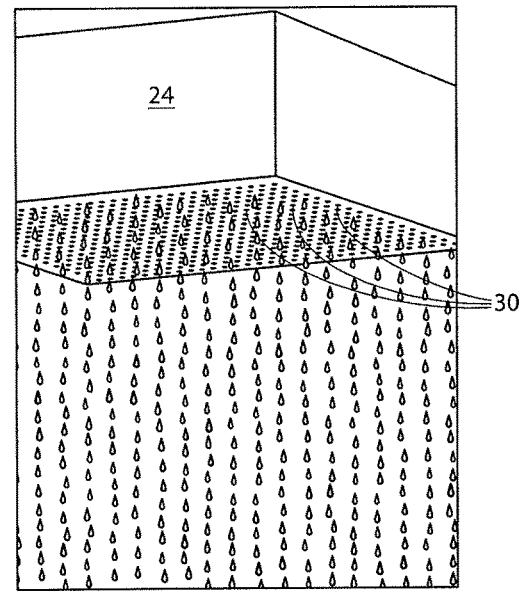

FIG. 6 illustrates a top plan view of the ozone rain pan of FIG. 2 with the lid removed. This embodiment illustrates an inlet 26 along one of the elongated sidewalls. This embodiment also illustrates a separate exhaust fan and destruct system, although it is possible for the systems to be stacked, as illustrated by FIG. 5.

The ozone rain pan 10 described herein is a significant improvement upon the more traditional use of spray jets. Due to the gaseous nature of ozone, spray jets can cause a loss of 70-80% or more of dissolved ozone from the dosing source stream. Additionally, the amount of time the product is actually being dosed with the ozonated spray water is very short, typically for only a matter of 1-2 seconds. Conversely, using the ozone rain pan described herein, the product will experience a continuous dose of ozonated water for longer. In specific examples, the treatment time may be more than 6 seconds (depending on the product conveyor speed, the length of the ozone rain pan, the size of the openings, and other modifiable parameters). In general, the ozone rain pan described allows 5-10 seconds of water treatment. If desired, even longer water treatment times may be achieved.

Ozone off gas can be a significant safety issue within a processing plant environment. The ozone rain pan disclosed herein will not create off gas from the dissolved ozone to the high extent that water spray jets do, due to the very low pressure drop of the ozonated water as it falls through the holes of the pan onto the product to be treated below. This substantially reduces the ozone off gas entering the work area, unlike the typical spray jet design. Additionally, the ozone rain pan includes a lid that will enclose the entire flooded area of ozonated water as it enters from the ozone skid. Connected to the lid is a pipe that goes to an exhaust fan that will pull air and the small amount of ozone off gas from within the rain pan and send it through a catalytic destruct unit that will completely convert the ozone back into pure oxygen. This will ensure a significantly safer work environment for the plant's employees as the potential level of gaseous ozone is nearly eliminated.

Changes and modifications, additions and deletions may be made to the structures and methods recited above and shown in the drawings without departing from the scope or spirit of the disclosure or the following claims.

What is claimed is:

1. An ozone rain pan system, comprising:
   an ozone rain pan frame comprising sidewalls, end walls, and a lower surface, collectively defining an ozone rain pan;
   the lower surface comprising a plurality of openings sized and configured to allow water to flow therethrough via rainfall gravity;
   at least one ozonated water inlet,
   the at least one ozonated water inlet cooperable with a water diverter; and
   an ozone rain pan lid,
   wherein the lower surface comprises a plurality of modular panels.

2. The ozone rain pan system of claim 1, wherein the rain pan frame further comprises side rails to which the plurality of modular panels are secured.

3. The ozone rain pan system of claim 2, further comprising a layer of sealant between the side rails and modular panels.

4. The ozone rain pan system of claim 1, wherein the ozone rain pan frame is provided as a series of separate components that are secured together upon assembly.

5. The ozone rain pan system of claim 1, further comprising an ozone destruct outlet.

6. The ozone rain pan system of claim 1, further comprising an exhaust fan for removing off gassed air from ozonated water held in the ozone rain pan.

7. The ozone rain pan system of claim 1, further comprising an overflow management system.

8. The ozone rain pan system of claim 7, wherein the overflow management system comprises an exit opening in one of the end walls that is bounded by an overflow wall.

9. The ozone rain pan system of claim 1, further comprising a system for mounting the ozone rain pan with respect to a conveyor.

10. The ozone rain pan system of claim 9, wherein the system for mounting the ozone rain pan comprises one or more adjustable legs, one or more adjustable feet, or both.

11. The ozone rain pan system of claim 9, wherein the system for mounting the ozone rain pan comprises a shower head-like mount.

12. The ozone rain pan system of claim 1, wherein the plurality of openings allow a rain stream of ozonated water to fall on one or more food products.

13. The ozone rain pan system of claim 1, mounted in a processing area for treatment of produce, poultry, or meat products.

14. The ozone rain pan system of claim 1, wherein the side walls and end walls define a rectangular ozone rain pan.

15. The ozone rain pan system of claim 1, wherein the side walls and end walls are between about 3 inches to about 8 inches high.

16. The ozone rain pan system of claim 1, wherein the plurality of openings range in size from about 0.02 inches to about 0.08 inches in diameter.

17. The ozone rain pan system of claim 1, wherein the plurality of openings are spaced from about 0.5 inches to about 1.5 inches between a center of one opening to a center of an adjacent opening and are arranged in a grid-like pattern.

18. A method for delivering a rain stream of ozonated water, comprising:
   (a) mounting the ozone rain pan system of claim 1 over a treatment zone; and
   (b) delivering ozonated water into at least one of the inlets of the ozone rain pan.

19. An ozone rain pan system, comprising:
- an ozone rain pan frame comprising sidewalls, end walls, and a lower surface,
- collectively defining an ozone rain pan;
- the lower surface comprising a plurality of openings sized and configured to allow water to flow therethrough via rainfall gravity;
- at least one ozonated water inlet,
- the at least one ozonated water inlet cooperable with a water diverter; and
- an ozone rain pan lid, wherein the water diverter comprises a water diverter pipe with a plurality of openings along an upper portion of the water diverter pipe.

20. The ozone rain pan system of claim 19, wherein the water diverter pipe comprises a central rod positioned within the water diverter pipe.

21. The ozone rain pan system of claim 19, wherein the water diverter pipe comprises one or more plates with openings thereon to manage water flow therethrough.

22. The ozone rain pan system of claim 19, wherein the water diverter pipe is configured to provide an even flow of water within the ozone rain pan.

23. The ozone rain pan system of claim 19, further comprising an ozone destruct outlet.

24. The ozone rain pan system of claim 19, further comprising an exhaust fan for removing off gassed air from ozonated water held in the ozone rain pan.

25. The ozone rain pan system of claim 19, further comprising an overflow management system.

26. The ozone rain pan system of claim 25, wherein the overflow management system comprises an exit opening in one of the end walls that is bounded by an overflow wall.

27. The ozone rain pan system of claim 19, further comprising a system for mounting the ozone rain pan with respect to a conveyor.

28. The ozone rain pan system of claim 27, wherein the system for mounting the ozone rain pan comprises one or more adjustable legs, one or more adjustable feet, or both.

29. The ozone rain pan system of claim 27, wherein the system for mounting the ozone rain pan comprises a shower head-like mount.

30. The ozone rain pan system of claim 19, wherein the plurality of openings on the lower surface of the ozone rain pan allow a rain stream of ozonated water to fall on one or more food products.

31. The ozone rain pan system of claim 19, mounted in a processing area for treatment of produce, poultry, or meat products.

32. The ozone rain pan system of claim 19, wherein the side walls and end walls define a rectangular ozone rain pan.

33. The ozone rain pan system of claim 19, wherein the side walls and end walls are between about 3 inches to about 8 inches high.

34. The ozone rain pan system of claim 19, wherein the plurality of openings on the lower surface of the ozone rain pan range in size from about 0.02 inches to about 0.08 inches in diameter.

35. The ozone rain pan system of claim 19, wherein the plurality of openings on the lower surface of the ozone rain pan are spaced from about 0.5 inches to about 1.5 inches between a center of one opening to a center of an adjacent opening and are arranged in a grid-like pattern.

36. A method for delivering a rain stream of ozonated water, comprising:
- (a) mounting the ozone rain pan system of claim 19 over a treatment zone; and
- (b) delivering ozonated water into the water diverter pipe of the ozone rain pan.

* * * * *